United States Patent [19]

Wagner

[11] 4,383,858
[45] May 17, 1983

[54] FIRE RETARDING ORGANOPHOSPHATE COMPOSITIONS

[75] Inventor: George M. Wagner, Lewiston, N.Y.

[73] Assignee: Occidental Chemical Corporation, Niagara Falls, N.Y.

[21] Appl. No.: 340,924

[22] Filed: Jan. 20, 1982

[51] Int. Cl.³ ............................................. C09D 5/18
[52] U.S. Cl. ............................ 106/18.14; 106/18.15; 106/18.18; 260/953; 427/397; 428/921
[58] Field of Search ............... 106/18.14, 18.15, 18.18; 260/928, 953; 428/921; 427/397

[56] References Cited

U.S. PATENT DOCUMENTS

| | | | |
|---|---|---|---|
| 2,372,244 | 3/1945 | Adams et al. | 260/953 |
| 3,900,327 | 8/1975 | Miller | 106/18.17 |
| 3,911,189 | 10/1975 | Miller | 260/953 |

Primary Examiner—Lorenzo B. Hayes
Attorney, Agent, or Firm—James F. Tao; A. S. Cookfair; W. G. Gosz

[57] ABSTRACT

A fire retarding composition is disclosed which is made from a reaction mixture of aqueous phosphoric acid and an alkylene oxide, wherein the weight ratio of oxide to acid reactants is within the range of about 0.01:1 to about 0.25:1. The composition produces improved fire retardancy when used to treat cellulosic material.

20 Claims, 2 Drawing Figures

0.29:1 OXIDE/ACID RATIO 0.06:1 OXIDE/ACID RATIO

FIRE RETARDING ORGANOPHOSPHATE COMPOSITIONS

BACKGROUND OF THE INVENTION

Cellulosic materials, such as paper, wood, rayon and cotton are highly flammable substances and when ignited, the fire spreads rapidly. Many methods for retarding the spread of such fires are known, but for many commercial uses, such methods are often too costly or ineffective or render the physical characteristics of the flame retarding product undesirable.

Cellulosic materials used throughout industry and the home are closely associated with humans. Consequently, methods of chemically treating them to resist burning must assure a safe living environment and preserve their aesthetic qualities, particularly when the product is wood. The use of volatile or harmful solvents should be minimized during the process for treating the product with a chemical flame retarding agent, especially when a residue of such a solvent would exude from the processed material. The chemical treatment also should not produce or leach toxid or ugly deposits onto the surface of the material and must also maintain the aesthetic qualities of the material through the broad range of environmental conditions it may be subjected.

Chemical methods for flame retarding treatment of ligno cellulosic material, such as plywood panels, furniture wood, cardboard, paper and the like, include the application of salts of phosphoric acid, boric acid, sulfamic acid and the like as well as various organic compounds in most instances in organic solvent systems. These methods are economically attractive but cause crystallization of salts on the surfaces of the treated wooden product after drying, and cause the migration of undesirable chemicals to the surfaces. In addition to these difficulties, the solvents used are volatile during the application of the flame retardants and exude from the finished product.

A process for treating cellulosic material so that it will resist burning has been described in U.S. Pat. No. 3,900,327. The flame retardant is a reaction product of an aqueous orthophosphoric acid or an acid ammonium salt thereof and an alkylene oxide. The product is obtained by reacting an aqueous solution of an orthophosphoric acid or an acid ammonium salt thereof containing from about 1 to about 85 percent by weight of orthophosphoric acid or the equivalent amount of the ammonium salt thereof with an alkylene oxide, ethylene oxide being specifically exemplified, in an amount of from about 0.5 to 1.5 times the weight of the orthophosphoric acid or equivalent thereof used. This flame retardant has proven to be environmentally attractive as it utilizes an aqueous solvent which is substantially nonvolatile. It nevertheless has several industrial disadvantages. When used in ligno cellulosic materials, it has difficulty meeting the Class II fire spread standard. Its rate of penetration into ligno cellulosic materials is too slow for the high speed equipment commonly used in the paper and wood panel industry. The cost of the treating chemicals, though lower than the majority of alternate chemical fire retardants, is sufficiently high as to cause an undesirable pricing of the finished product. In commercial processing, it has tended to produce crystals on the surfaces of the treated material, although this tendency is significantly reduced from other treatment processes; and, in highly humid atmospheres, it causes unattractive blotching rendering the finished product aesthetically and therefore commercially unacceptable.

Accordingly, a need exists for an economical, effective process and composition which will retard the spread of a fire in ligno cellulosic materials. The process should effect rapid penetration of the flame retardant composition through the surface of the cellulosic material and the composition should not deleteriously affect the surface characteristics of the treated product under a wide range of environmental conditions.

OBJECTS OF THE INVENTION

It is, therefore, an object of this invention to provide economically attractive ligno cellulosic products and other products having improved burn resistance against continuous combustion.

Another object is to provide improved flame retarding compositions for use with cellulosic or other materials which rapidly penetrate into the material without deleteriously affecting surface characteristics under a broad range of environmental conditions.

Yet another object is to provide a process for treating cellulosic materials so that they resist continuous combustion.

SUMMARY OF THE INVENTION

These and other objects are achieved by the present invention, which is directed to a phosphate containing fire-retarding composition and a fire-resistant combustible product which has been treated with an effective amount of the composition.

The composition is a reaction mixture of about 1 to about 85 weight percent aqueous phosphoric acid and an alkylene oxide of two to four carbons. The weight ratio of oxide to acid used in the reaction mixture is within the range of about 0.01:1 to about 0.25:1, based on the weight of 100 percent phosphoric acid or equivalent thereof.

A preferred composition is one wherein the phosphoric acid is ortho, pyro, meta or hypo phosphoric acid and wherein the alkylene oxide is of three or four carbon atoms.

Another especially preferred embodiment is one wherein the reaction mixture contains a glycol selected from an alkanediol of two to four carbons, a bis-(hydroxyalkyl) ether having two to four carbons in each hydroxyalkyl group, or a bis-(hydroxyalkoxy) alkane having two to four carbons in each hydroxyalkoxy group and in the alkane group.

Preferred embodiments of the composition include those wherein the alkylene oxide reactant is propylene oxide, ethylene oxide or butylene oxide and wherein about 35 to about 85 weight percent aqueous phosphoric acid is used.

The fire resistant combustible product is the combination of an effective amount of the flame retarding composition and a combustible material. Such combustible materials are typically cellulosic materials, but the fire retarding composition is particularly suitable to ligno cellulosic materials, e.g. those cellulosic materials containing lignin. The composition is applied to the material in an amount which will effectively retard the spread of flame after the treated material is dried. For ligno-cellulosic material, an effective fire retarding amount is generally that amount of composition which will impart Class II combustion resistant character to the cellulosic material as defined by the American Society of Testing Materials Test Standard E-84 or TAPPI Standard Test T-461. Effective fire retarding amounts for other materials meet similar appropriate standards.

The composition of the invention possesses improved characteristics in relation to similar agents made from reaction mixtures containing the oxide and acid in weight ratios which are not within the foregoing range of oxide to acid weight ratios. First, the same amount of the composition of the invention relative to these agents produces a higher limiting oxygen index for combustion resistance such as that shown by the standard OI Test, ASTM D 2863. In particular, for ligno-cellulosic material, a lower amount of the composition relative to these agents is required in order to produce a limiting oxygen index in this Standard OI test of at least about 50, which corresponds to a Class II combustion resistance rating, therefore resulting in a significant decrease in chemical cost. Second, when applied to ligno-cellulosic materials, the composition of the invention suppresses the appearance of crystals or solid particles of inorganic or organic compounds on the surface of the material. Thirdly, the composition of the invention penetrates the ligno-cellulosic material at a faster rate and to a greater depth allowing the use of more efficient high speed equipment.

The foregoing characteristics are important features of the compositions of the invention within the range of oxide to acid ratios. In addition, the compositions of the invention made from oxide and acid within a range of oxide to acid weight ratios of 0.01:1 to 0.25:1 show a decreased hydroscopicity under high humidity conditions when applied to cellulosic materials. This preferred characteristic prevents minor exudation of the composition from the interior of cellulosic material which significantly detracts from the appeal of the material surface in a finished state. The reduction in minor exudation also results in further savings in sanding time and wear of sanding and grinding surfaces during the commercial process.

A preferred cellulosic product is one wherein the material is wood, such as plywood which is unfinished, finished, photoprinted, coated or otherwise treated, finished wood, hard and soft wood for structural or furnishing use, veneered wood or other wood products of a solid or composite structure. For these wood products, it is preferred to apply an amount of composition to the surface of the wood which will deliver at least about 8 grams of phosphorus per square meter of surface area. Preferred embodiments of wood and products having processed or treated surfaces wherein the weight ratio of the oxide to acid used in the reaction mixture of the composition is within the range of about 0.01:1 to about 0.25:1; wherein the composition is formed from butylene oxide or propylene oxide; and wherein the composition is formed from about 35 to about 85 weight percent phosphoric acid. A further preferred embodiment is a cellulosic material treated with the composition which has been neutralized with ammonia.

DETAILED DESCRIPTION OF THE INVENTION

Figure 1:
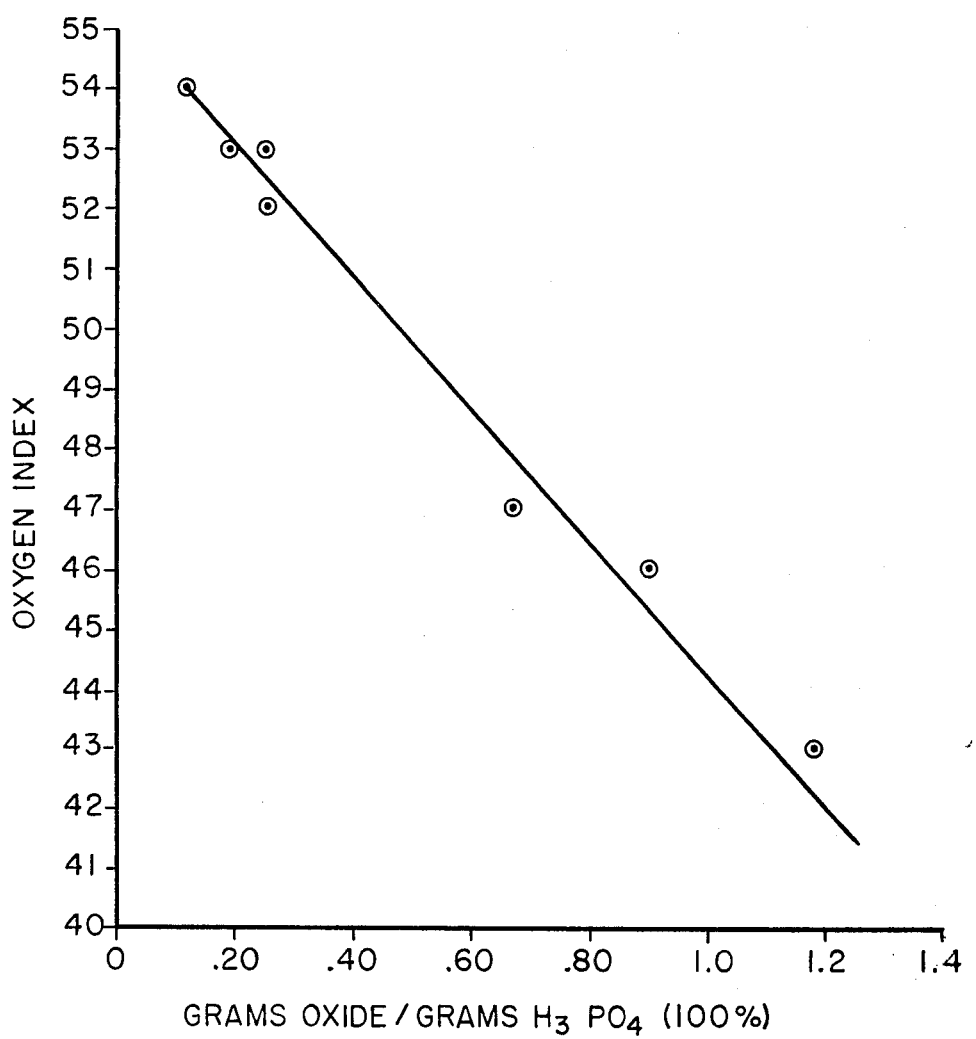
FIG. 1 illustrates the relationship between Oxygen Index and the weight ratio of various oxides to acid used to make the compositions of the invention or similar agents on Luan test samples.
Figure 2B:
FIG. 2 is a photograph illustrating the effect of exudation, under high humidity conditions, for compositions within and outside the weight ratio of the invention.
Figure 2B:
Figure 2A:
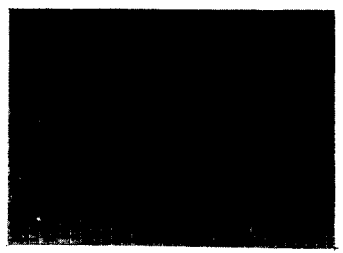
Figure 2A:

The composition of the invention is a complex reaction mixture of several condensation and hydrolysis products and phosphate derivatives of the alkylene oxide as well as inorganic phosphate compounds. The fire retardancy is provided by all products in the reaction mixture which contain phosphate or a phosphoric acid derivative. The other organic products cooperate with the phosphate-derivative products to produce the improved characteristics of the composition. The products in the reaction mixture include organophosphate mono-, di- and triesters, phosphoric acid, its salts and higher order congeners, water and the hydrolysis and condensation products produced by reaction of the alkylene oxide in acidic aqueous media. The glycols mentioned in the foregoing discussion constitute some of these hydrolysis and condensation products.

In order to achieve the improved characteristics of the composition, it is required to maintain a weight ratio of oxide to acid in the reaction mixture within the range of about 0.01:1 to about 0.25:1 based upon the weight of 100 percent phosphoric acid or equivalent thereof present. As discussed below, an oxygen index of at least about 50 in the Standard ASTM-D-2863 Test using a phosphorous application of about 10 g. per sq. meter and avoidance of the production of hydroscopic blotching at high humidity from inorganic or organic compounds of the surface of the treated cellulosic material, is achieved when the weight ratio is maintained at or below about 0.25:1, preferably within the range of about 0.05:1 to about 0.25:1 and most preferably within the range of about 0.1:1 to about 0.25:1. Therefore, the improved characteristics of the invention establish the limitations for this range of weight ratios.

Typical alkylene oxides which can be employed to make the composition of the invention include ethylene oxide, 1,2-propylene oxide, 2, 3-butene oxide, 1, 2,-butene oxide, isobutylene oxide, oxacyclobutane, and other similar oxygen-containing compounds.

Phosphoric acid can be used in any of the known forms, including orthophosphoric acid, metaphosphoric acid, pyrophosphoric acid, hypophosphoric acid the like. A minor amount of water in solution with the phosphoric acid is essential in order to produce the proper reaction mixture. Commercially available forms of phosphoric acid in water are available as solutions containing up to and including 85 weight percent phosphoric acid. Higher weight percents of phosphoric acid may be produced by mixing 100% phosphoric acid with the appropriate amount of water. These mixtures are also included within the concept of the invention as long as the water is present. The phrase "about 85 weight percent" will be understood to include these forms.

Preferred reaction ingredients include orthophosphoric acid and propylene oxide or butylene oxide.

Preferred aqueous solutions of the phosphoric acid include those from about 35 to about 85 weight percent aqueous phosphoric acid or its equivalent.

The process to prepare the reaction mixture involves addition of the alkylene oxide to the aqueous solution of phosphoric acid. The aqueous solution of acid is placed in an appropriate reactor equipped with a stirring or agitating means and the alkylene oxide is bubbled as a gas or dripped as a liquid into the solution under neat conditions as is appropriate for the physical state of the oxide at room temperature and pressure. The exothermic reaction may be controlled by external cooling of the reactor vessel and by employing a cold water, brine or dry ice condensor as is appropriate. The weight increase of the solution resulting from the addition of the oxide is monitored so as to produce a final weight ratio within the limits set forth above. Other appropriate means of measuring the amount of oxide added may also be used. These would include volumetric measurements, weight loss measurements and the like. The temperature of the reaction is maintained within about 0° to about 100° C. at all times during the reaction; preferably, the reaction temperature is held within a range of about 10° C. to about 80° C. After addition of the oxide is complete, the reaction is allowed to stir until exothermicity ceases. The reaction then or shortly thereafter is substantially complete.

The reaction mixture can be used directly as a fire retarding composition or can be neutralized to a pH of about 6.0 to about 7.5 or higher with ammonia or other alkaline materials, such as ammonium hydroxide or organic amines, such as methyl amine, ethylamine, ethylene diamine, triethyl amine, tetraethylene diamine and the like. Preferred neutralizing ingredients include ammonia and ammonium hydroxide. In general, the reaction mixture may be used in concentrated form or may be diluted with water before or after neutralization as would be appropriate in order to produce a composition having a concentration which will deliver a desired effective amount of the composition to the cellulosic material treated under the particular application method and conditions employed.

The composition may be applied to cellulosic materials by any method which will appropriately cover the surface of the solid material with the liquid composition. Such methods generally include spraying, immersing, flooding, bath purging, drip flushing, batch and continuous processing through tanks, dips or through sprays, by wick or absorptive fiber treatment or by other similar known methods. In a typical treatment process for liquid cellulosic material, 4 feet×8 feet sheets of plywood on a high speed assembly line are preheated to a temperature of about 40° C. to 150° C. and the top surfaces are over-sprayed or coated with composition using a wick or absorptive fiber method or a spray stream, mist, drip or surface sheet dip method. Excess composition is removed from the surfaces after intimate contact for at least about one to three seconds. The plywood is then processed in a typical manner for finished cellulosic materials which would include a drying cycle step.

The phosphorus loading is calculated by subtracting the initial weight of the material from its wet weight and multiplying by the phosphorus content of the composition. The concentration of the composition and its application rate to the surface of cellulosic material should be calculated to produce a Class II flame spread rating which typically requires delivery of at least about 8 grams of phosphorus per square meter area of cellulosic material surface when the cellulosic material is a wood or wood product, such as plywood, finished wood, hard wood, composition board, and the like. Other cellulosic materials will require varying amounts of phosphorus loading, which will depend upon the density of the cellulosic material, its dimensions, other ingredients in the cellulosic material, such as wood filler, binder, glue, finish, stain, inorganic salts, and the like. The appropriate amount will be determined by testing for a 50 oxygen index and a Class II flame spread rating. These tests are well known to those skilled in the art and are described below. Other combustible materials may be processed in a similar manner and the application of composition may be adjusted so that the desired fire retarding effect is produced.

The improved characteristics of the composition of the invention are shown by its ability to produce fire retardancy in cellulosic products and its ability to prevent crystal or particulate formation of inorganic or organic compounds on the surfaces of the treated cellulosic materials. The fire retardancy of the composition can be measured by the oxygen index Standard Test ASTM D2863. Generally, the oxygen index test determines the amount of oxygen in a closed atmosphere which is required to support the combustion of a threeply, 15 cm×15 cm×3.6 mm plywood board which has been treated on one face with the fire retarding composition. A second, fire retardancy test is the 24 foot tunnel standard test performed according to ASTME-84-79A. Generally this test employs 21 inch×24 ft. samples, of any thickness, treated with flame retarding compositions which are used as the ceiling in the tunnel. The boards are ignited by gas burners at one end of the tunnel and the flame spread distance is observed and recorded every fifteen seconds. Flame spread distance versus time is plotted in terms of feet versus seconds. By definition, a flame spread index of less than 25 is Class I, from 25–75 is Class II and over 75 is Class III.

Oxygen index (index 9OI) data on Luan test samples which is presented in Example 3 for compositions of the invention and agents made from reaction mixtures of various oxides and phosphoric acid having weight ratios within and outside the invention show a relationship between reactant ratios and OI values. This relationship has been plotted in FIG. 1 and demonstrates that at lower phosphorus levels, to achieve OI values which are consistently 50 or more, that OI value which in accord with Table 6 maintains flame spread within a Class II rating, the ratio of oxide to acid reactant should be from about 0.01:1 to about 0.25:1, preferably from about 0.05:1 to about 0.25:1 and most preferably from about 0.1:1 to about 0.25:1.

As the data plotted in FIG. 1 illustrate, at a constant phosphorus application level, the 50 OI value is achieved by compositions of the invention while agents having an oxide to acid weight ratio higher than about 0.5:1 produce an OI value lower than 50.

It will be understood by those skilled in the art that OI and FS values are generally a function of the amount of fire retardant present in the material treated. Hence, larger amounts of retardant contained in the material will generally produce higher OI and lower FS values. The improved characteristics of the invention, however, achieve a constant OI or FS value with a lesser amount than is required for agents outside the invention. Although higher amounts of agents outside the invention could be applied in an attempt to increase OI values to higher levels, such a modification requires a longer contact time between the agent and the material to be treated. In addition, saturation may be reached which places an upper limit on the amount of retardant that can be applied. Therefore, the improved characteristics of the invention permit a shorter application time, use of lower amounts of composition, more uniform distribution, more substantial penetration of the composition to all parts of the material and avoid effects resulting from saturation of the material.

In general, the presence in the composition of the organic products derived from the alkylene oxide cooperate to prevent the formation of crystalline or particulate organic or inorganic compounds on the surface of the cellulosic material. This effect is achieved by the compositions produced by oxide to acid weight ratios at least about 0.01:1. Example 4 illustrates this effect for treated, dried plywood samples.

High humidity conditions often cause water-soluble, flame retardant salts to exude onto the surface of treated cellulosic materials. It is believed that under high relative humidity conditions, the hydroscopicity of some of the chemicals in the compositions of the invention causes absorption of moisture from the air. Consequently, a composition-treated cellulosic material may exude fire retardant salts and other chemicals. This effect does not destroy the fire retarding properties of the treated cellulosic materials, but in fine finished woods, such as paneling and those used for furniture and for interior woodwork, such exudation under high humidity conditions causes discoloration of the finish. Surprisingly however, it has been found that compositions of the invention made from reaction mixtures formed with oxide to acid weight ratios within the range of about 0.01:1 to about 0.25:1 do not cause exudation under high relative humidity conditions. Example 5 illustrates this effect and further describes the test procedures. FIG. 2 is a photograph of the comparative aesthetic effect of exudation on paneling treated using the same reactants by (A) at a weight ratio within the invention; and (B) at a weight ratio of 0.5:1.

The following examples further illustrate some embodiments and some of the features and characteristics of the invention. They are provided herein for illustrative purposes only and are not meant as limitations of the invention, which is fully set forth in the claims and in the foregoing description. Unless otherwise stated, all parts in the examples are parts by weight and all temperatures are in degrees Farehheit.

EXAMPLE 1

General Process for the Preparation of Compositions of the Invention

Oxyalkylation of phosphoric acid followed by partial neutralization with ammonia results in a product having high fire retardancy for cellulosic materials.

Compositions utilizing propylene oxide were prepared by the following process. A mixture of 85% orthophosphoric acid and water was placed in a reactor vessel. Propylene oxide as a neat liquid in a dry ice/acetone cooled addition funnel was dripped into the aqueous phosphoric acid solution over a period of about twenty minutes. The exothermic reaction which developed was cooled by a water bath. After the addition was complete, the reaction solution was neutralized to pH 6.8 with 30% ammonium hydroxide. Table 1 summarizes the relative amounts of propylene oxide (PO) acid and water used to prepare the PO compositions.

TABLE 1

| | Propylene Oxide Compositions | | | |
|---|---|---|---|---|
| Gms. PO | gms. Acid (100%) | gms. Water | gms. Ammonia | Composition |
| 19 | 100 | 93 | 25.5 | PO1 |
| 25.0 | 100 | 81 | 25.5 | PO2 |

Compositions utilizing ethylene oxide were prepared by the following procedure. The foregoing propylene oxide procedure was repeated except that ethylene oxide was bubbled into the 85% orthophosphoric acid solution which was cooled by a water bath. The weight of the solution was periodically monitored to determine the amount of ethylene oxide which had been absorbed into solution. Table 2 summarizes the amounts of ethylene oxide (EO), acid and water used to prepare these EO compositions.

TABLE 2

| | Ethylene Oxide Compositions | | | |
|---|---|---|---|---|
| gms. EO | gms. Acid (100%) | gms. Water | gms. Ammonia | Composition |
| 11.2 | 100 | 99 | 25.5 | EO1 |
| 25.0 | 100 | 77 | 25.5 | EO2 |

In a similar manner, the other compositions of the invention may be prepared by employing the above procedure and substituting the appropriate alkylene oxide and appropriate aqueous phosphoric acid.

Agent Preparation

For comparison, agents produced from oxide to acid ratios outside the range of the invention were also prepared. The process employed followed the general process described above. Table 3 summarizes the amounts of ethylene oxide, propylene oxide acid and water which were employed.

TABLE 3

| | | Agents Outside the Invention | | | |
|---|---|---|---|---|---|
| gms. EO | gms. PO | gms. Acid (100%) | gms. Ammonia | gms. Water | Agent |
| 67.3 | — | 100 | 25.5 | 44 | A1 |
| 89.8 | — | 100 | 25.5 | 22 | A2 |
| — | 118.4 | 100 | 25.5 | — | A3 |

EXAMPLE 2

Treatment of Wood Panels with Compositions of the Invention

Luan panels were treated with compositions of the invention and the agents described in Example 1 according to two methods. The first method involved treatment of a 15 cm by 15 cm by 3.6 mm 3-ply luan panel. The second method involved treatment of 21 inch by 24 feet by 3.6 mm panels of luan. The large and small panels were treated on one face only.

In the first method, the small luan sample was first contacted with a metal heat source, the surface of which was at varying temperatures for about 5 to 10 seconds. Immediately after heating, the face of the luan sample was flooded with the composition or agent and the surface face was then wiped with a flexible wiping blade, such as a squeegee, after 2 to 10 seconds contact of the composition or agent with the luan sample. The luan sample was then dried in a forced air oven. Table 4 summarizes the details.

In the second method, large panels were continuously treated on a machine which consisted of dry rolls, a hot air source for preheating the panels, and a circulating pump that continuously sprayed the composition on one surface of the panel. A large flexible wiper blade removed excess composition after 2 to 10 seconds contact with the panel surface, and the excess composition was recycled to the circulating pump. The treated panels were then dried in a large oven at about 40° C. Table 4 summarizes the types of panels treated, the types of compositions employed for treatment and the amounts of phosphate per square meter of surface area applied to the panels.

The results indicate that, under limited contact time exposure, the amount of phosphorus flame retardant deposited on the substrate does not vary significantly with variation of alkylene oxide to acid weight ratios, except as the weight ratio moves below about 0.15:1.

TABLE 4

Plywood Treatment First Method

| Composition | Pretreatment Temperature °F. | Contact Time, Secs. | G. Phosphorus/M² |
| --- | --- | --- | --- |
| PO 1 | 350 | 10 | 14 |
| PO 2 | 350 | 10 | 16 |
| EO 1 | 400 | 10 | 15 |
| EO 2 | 400 | 10 | 15 |
| A 1 | 350 | 10 | 15 |
| A 2 | 350 | 10 | 16 |
| A 3 | 400 | 10 | 15 |

Plywood Treatment Second Method

| Composition | Pretreatment Temperature °F. | Contact Time, Secs. | G. Phosphorus/m² |
| --- | --- | --- | --- |
| EO 1 | 300 | 10 | 11 |
| EO 2 | 300 | 10 | 15 |
| A 2 | 300 | 10 | 15 |
| PO 1 | 300 | 10 | 15 |
| PO 2 | 300 | 10 | 15 |

EXAMPLE 3

Limiting Oxygen Index Test

The limiting oxygen index test generally determines the concentration of oxygen in a closed atmosphere required to support the combustion of a fire retardant treated cellulosic material. In particular, the luan test samples, measuring 15 cm by 3.6 mm described in Example 2, were employed in this test. After treatment and drying, the back face and all edges of the sample to be tested were covered by aluminum foil. The sample was then vertically positioned in an inverted bell jar, which was flushed with an artificial atmosphere generated by an oxygen and nitrogen mixing device which could produce varying concentrations of oxygen. After 10 seconds of flushing with the oxygen/nitrogen atmosphere, the upper front face surface of the sample was ignited with a pencil flame gas burner and was flamed for 5 seconds, after which the flame was extinquished. The minimum oxygen concentration required to support combustion for 30 seconds after flame extinguishment was recorded as the limiting oxygen concentration required to support combustion. Table 5 summarizes the data produced by this test upon luan samples of Example 2 treated with the compositions and agents of Example 1.

The results indicate that the weight ratio of the alkylene oxide to acid reactant has a significant effect upon oxygen index even though the amount of phosphorus deposited on the substrate may be substantially equivalent.

TABLE 5

Oxygen Index Test

| Composition | O.I. |
| --- | --- |
| PO 1 | 53 |
| PO 2 | 53 |
| EO 1 | 54 |
| EO 2 | 52 |
| A 1 | 47 |
| A 2 | 46 |
| A 3 | 43 |

Flame Spread Test

The flame spread test was conducted upon the luan panels, which were used as an artificial ceiling material in a 24 foot flame spread tunnel conducted according to Standard Test ASTME-84-79A. The test was conducted according to the following method:

This method was designed to determine the relative surface burning characteristics of materials under specific test conditions. Results are expressed in terms of flame spread (FS), smoke developed (SD) and fuel contribution (FC), compared to asbestos cement board (designated as 0) and red oak designated at (100).

The metal tunnel having horizontal ledges along the walls was preheated to 65.5° C., as measured by a floor-embedded thermo-couple located 23.3 ft downstream of the burner ports, and allowed to cool to 40.5° C., as measured in the floor of the tunnel 13 ft from the burners. At this time, the 21 inch by 24 feet by 3.6 mm Luan plywood sample, was mounted across the ledges, 1 ft. above the floor of the tunnel, to form the ceiling.

Upon ignition of the gas burners, the flame spread distance was observed and recorded every 15 seconds. Flame spread distance versus time was plotted ignoring any flame front recession. If the area under the curve ($A_T$) is less than 97.5 min-ft. FS=0.1515 $A_T$; if greater, FS=4900/195-$A_T$. Smoke developed and fuel contribution is determined by comparing the area under the obscuration and temperature curve for the test sample to that of red oak.

Materials with flame spread values of 25 or lower are labeled Class I, those with flame spreads between 75 and 25 are labeled Class II, and materials with flame spreads greater than 75 are labeled Class III.

Table 6 summarizes the flame spread test results performed upon luan panels of Example 2 treated with compositions and agents of Exmaple 1.

The results indicate that critical flame spread values, within the required limits of Class II flame spread definition, can be unexpectedly achieved, at varying phosphorus flame retardant levels, at an alkylene oxide to acid reactant weight ratio from about 0.01:1 to about 0.45:1.

TABLE 6

| Composition | Gms P/Meter² | F.S. Value | Class |
| --- | --- | --- | --- |
| EO 1 | 11 | 69 | II |
| EO 2 | 19 | 55 | II |
| A 2 | 15 | 77 | III |
| PO 1 | 15 | 47 | II |
| PO 2 | 15 | 48 | II |

EXAMPLE 4

Crystalline Particulate Production

Production of inorganic or organic crystal or particulate matter on the surface of cellulosic materials is observed by following the luan panel treatment described in Example 3 for the small-size samples. After treatment, the samples are visually examined for particulate or crystalline matter on the surface. A rating scale of 0 to 3, wherein 0 is no crystal or particulate matter, 1 is neglible matter, 2 is moderate and 3 is heavy, is employed. Table 7 summarizes the data produced by compositions or agents used to treat the luan samples.

TABLE 7

| Crystalline or Particulate matter test | |
|---|---|
| Composition | Rating |
| PO 1 | <1 |
| PO 2 | 0 |
| EO 1 | <1 |
| EO 2 | 0 |
| A 1 | 0 |
| A 2 | O |
| A 3 | 0 |
| No Alkylene Oxide | 3 |

EXAMPLE 5

Hydroscopicity

Specimens of luan panels treated as described in Example 3 and employing compositions described in Example 1 were placed in a controlled atmosphere container and maintained at 28° C. and 90 percent relative humidity for one week. Upon removal of the samples from the container, the surfaces were visually examined for traces of exuded fire-retardant salts, finish blotching and other unattractive characteristics. Table 8 summarizes these results of various compositions.

TABLE 8

| Unattractive Blotching Produced by Hydroscopicity | |
|---|---|
| Composition | Rating |
| PO 1 | 0 |
| PO 2 | 0 |
| EO 1 | 0 |
| EO 2 | 0 |
| A 1 | 2 |
| A 2 | 3 |
| A 3 | 3 |

What is claimed is:

1. A fire retarding composition for cellulosic material, comprising:
   a reation mixture formed from aqueous phosphoric acid; and
   an alkylene oxide of 2 to 4 carbons, the weight ratio of oxide to acid being within the range of about 0.01:1 to about 0.25:1, such ratio based upon the weight of 100 percent phosphoric acid or equivalent thereof present.

2. A composition according to claim 1, wherein the cellulosic material is ligno-cellulosic material.

3. A composition according to claim 1 or 2, wherein the aqueous phosphoric acid is from about 1 to about 85 weight percent ortho, pyro, meta or hypophosphoric acid.

4. A composition according to claim 1, wherein the reaction mixture contains a glycol selected from an alkanediol of 2 to 4 carbons, a bis(hydroxyalkyl) ether having 2 to 4 carbons in each hydroxyalkyl group, or a bis(hydroxyalkoxy) alkane having 2 to 4 carbons in each hydroxyalkoxy group and in the alkane group, provided that the hydroxyalkyl, hydroxyalkoxy and alkane groups have the same number of carbons as the alkylene oxide.

5. A composition according to claim 1, wherein the alkylene oxide is propylene oxide, butylene oxide or ethylene oxide.

6. A composition according to claim 1, formed from about 35 to about 85 weight percent aqueous phosphoric acid.

7. A composition according to claim 5, wherein the alkylene oxide is propylene oxide.

8. A composition according to claim 6 wherein the alkylene oxide is propylene oxide or butylene oxide.

9. A composition according to claim 1, which further comprises the reaction mixture neutralized with ammonia or an alkaline material.

10. A fire resistant cellulosic product, which comprises:
    an effective amount of the fire retarding composition according to claim 1 in combination with ligno-cellulosic material.

11. A cellulosic product according to claim 10, wherein the ligno-cellulosic material is wood, plywood, composite wood, or a wooden fiber substance.

12. A fire resistant cellulosic product according to claim 11, wherein the material is wood, plywood or composite wood.

13. A cellulosic product according to claim 11 or 12, wherein an amount of composition has been applied to the surface of the cellulosic material which delivers at least about 8 gms. of phosphorous per square meter.

14. A product according to claim 10, 11 or 12 wherein the composition is formed from ethylene oxide, butylene oxide or propylene oxide.

15. A product according to claim 10, 11 or 12 wherein the composition is formed from about 35 to about 85 weight percent aqueous phosphoric acid.

16. A product according to claim 10, 11 or 12, wherein the composition is neutralized with ammonia before it is combined with the cellulosic material.

17. A composition in accord with claim 1, 2, 4, 5, 6, 7, 8 or 9 wherein the ratio of oxide to acid is from about 0.05:1 to about 0.25:1.

18. A composition in accord with claim 1, 2, 4, 5, 6, 7, 8 or 9 wherein the ratio of oxide to acid is from about 0.1:1 to about 0.25:1.

19. A fire resistant cellulosic product of claim 10, 11 or 12 wherein the ratio of oxide to acid is from about 0.05:1 to about 0.25:1.

20. A fire resistant cellulosic product of claim 10, 11 or 12 wherein the ratio of oxide to acid is from about 0.1:1 to about 0.25:1.

* * * * *